(12) United States Patent
Yoon

(10) Patent No.: US 9,810,317 B2
(45) Date of Patent: Nov. 7, 2017

(54) METHOD FOR CONTROLLING DRIVING OF VEHICLE

(71) Applicant: HYUNDAI MOTOR COMPANY, Seoul (KR)

(72) Inventor: Young Min Yoon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 31 days.

(21) Appl. No.: 15/091,171

(22) Filed: Apr. 5, 2016

(65) Prior Publication Data

US 2017/0114889 A1    Apr. 27, 2017

(30) Foreign Application Priority Data

Oct. 26, 2015    (KR) ........................ 10-2015-0148634

(51) Int. Cl.
| | |
|---|---|
| F16H 61/02 | (2006.01) |
| F16H 61/12 | (2010.01) |
| F16H 61/688 | (2006.01) |
| F16H 59/42 | (2006.01) |
| F16H 59/44 | (2006.01) |

(52) U.S. Cl.
CPC ......... *F16H 61/0246* (2013.01); *F16H 61/12* (2013.01); *F16H 61/688* (2013.01); *B60Y 2300/18033* (2013.01); *F16H 59/42* (2013.01); *F16H 59/44* (2013.01); *F16H 2059/443* (2013.01); *F16H 2061/1284* (2013.01)

(58) Field of Classification Search
None
See application file for complete search history.

(56) References Cited

U.S. PATENT DOCUMENTS

| | | | | |
|---|---|---|---|---|
| 8,880,288 | B2* | 11/2014 | Li | B60T 8/172 180/199 |
| 2002/0173894 | A1* | 11/2002 | Gorys | B60W 10/06 701/51 |

(Continued)

FOREIGN PATENT DOCUMENTS

| | | |
|---|---|---|
| JP | H06-272758 A | 9/1994 |
| JP | 2003-301897 A | 10/2003 |
| JP | 2011-237003 A | 11/2011 |

(Continued)

OTHER PUBLICATIONS

Korean Office Action dated Jan. 11, 2017, issued in Korean patent application No. 10-2015-0148634.

*Primary Examiner* — Edwin A Young
(74) *Attorney, Agent, or Firm* — McDermott Will & Emery LLP

(57) ABSTRACT

A method for controlling driving of a vehicle includes diagnosing whether or not a wheel speed sensor has failed when a shift lever is changed to an R-range while a vehicle travels in a lowest forward gear provided on a same shaft as a reverse gear is provided, disengaging the lowest forward gear and then engaging the reverse gear when the wheel speed sensor is diagnosed to be in a normal state, and calculating a vehicle speed using the wheel speed sensor in a simultaneous disengagement range, in which an odd gear and an even gear are simultaneously disengaged, during gear engagement in the disengagement of the lowest forward gear and then engaging the reverse gear.

7 Claims, 4 Drawing Sheets

(56) References Cited

U.S. PATENT DOCUMENTS

2014/0379215 A1* 12/2014 Kikuchi .............. B60G 17/018
                                                        701/37
2015/0057861 A1*  2/2015 Nakajima ....... B60W 30/18027
                                                        701/22

FOREIGN PATENT DOCUMENTS

| JP | 5528302 B2 | 6/2014 |
|----|---|---|
| KR | 10-2011-0138672 A | 12/2011 |
| KR | 10-1339269 B1 | 12/2013 |
| KR | 10-2014-0049856 A | 4/2014 |
| KR | 10-2015-0044351 A | 4/2015 |

\* cited by examiner

[FIG. 1]
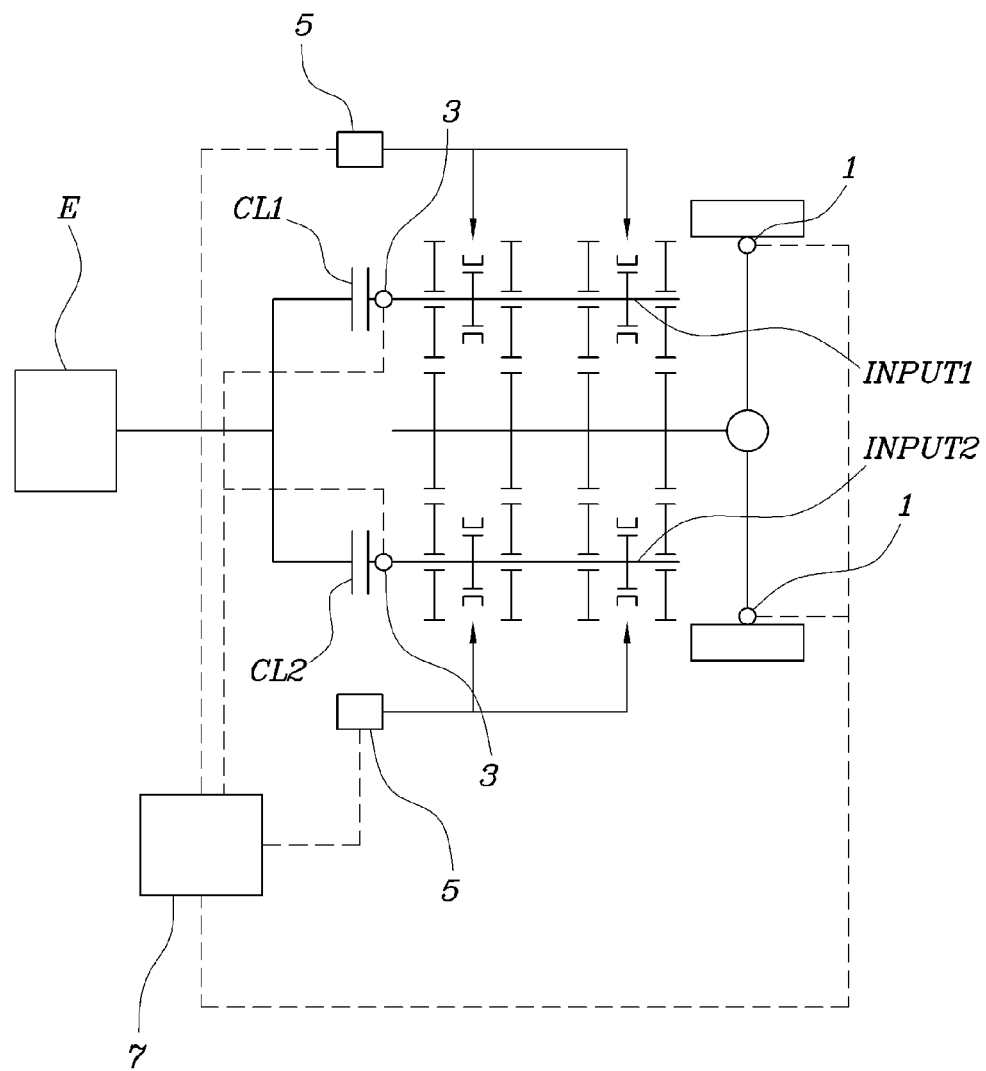

[FIG. 2]
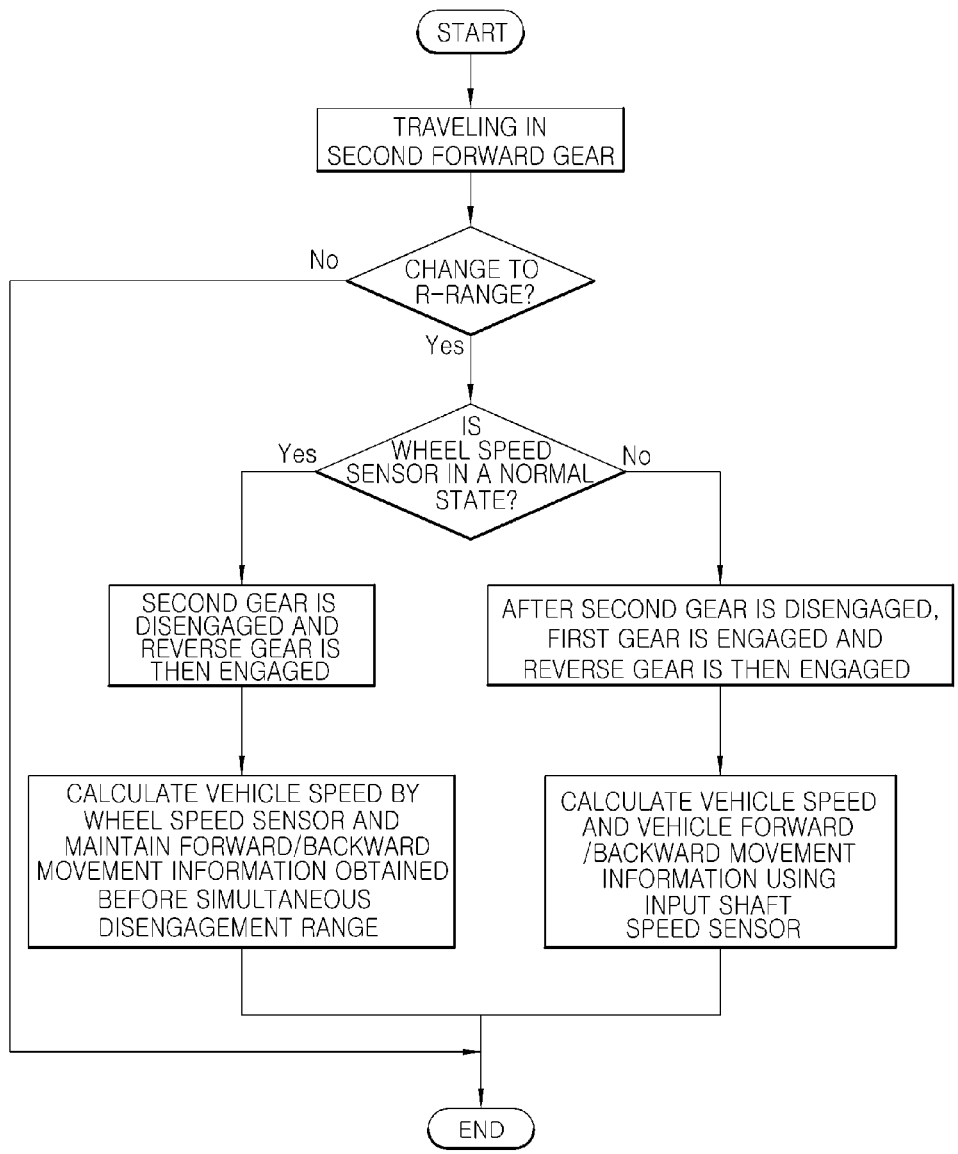

[FIG. 3]
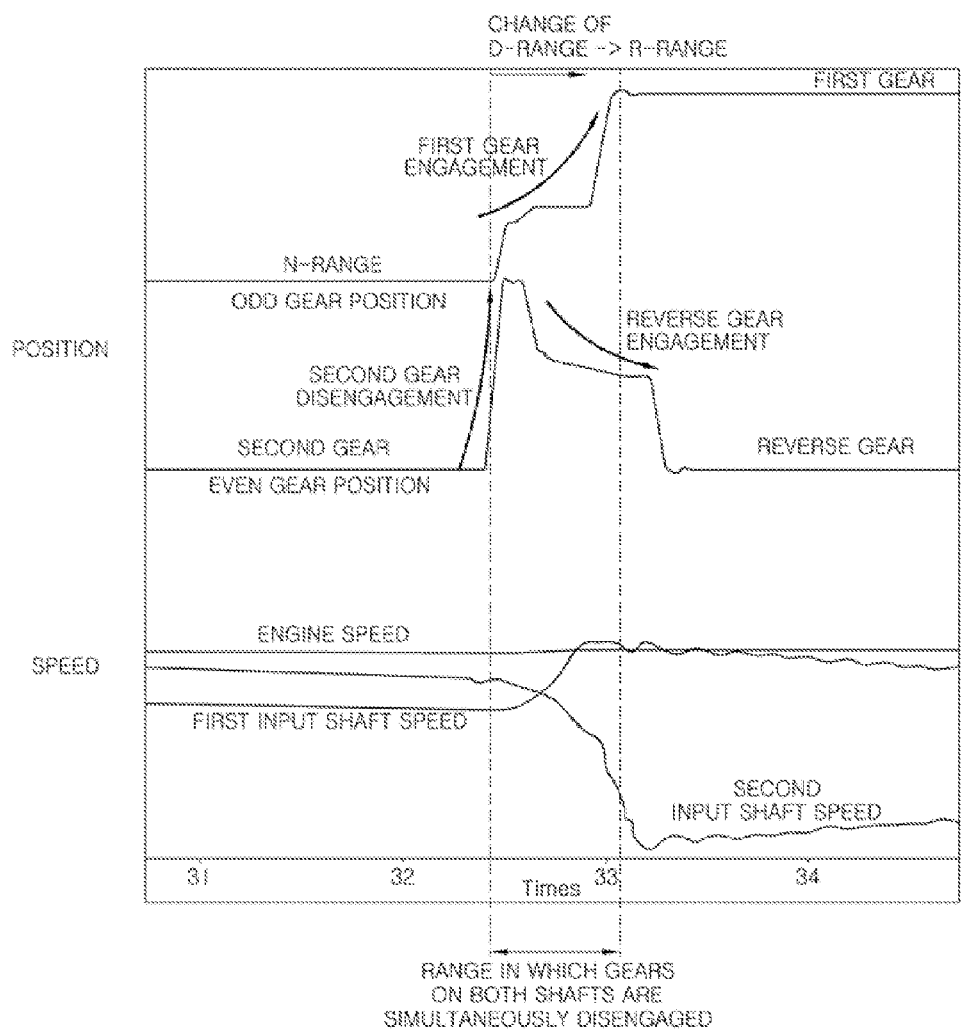

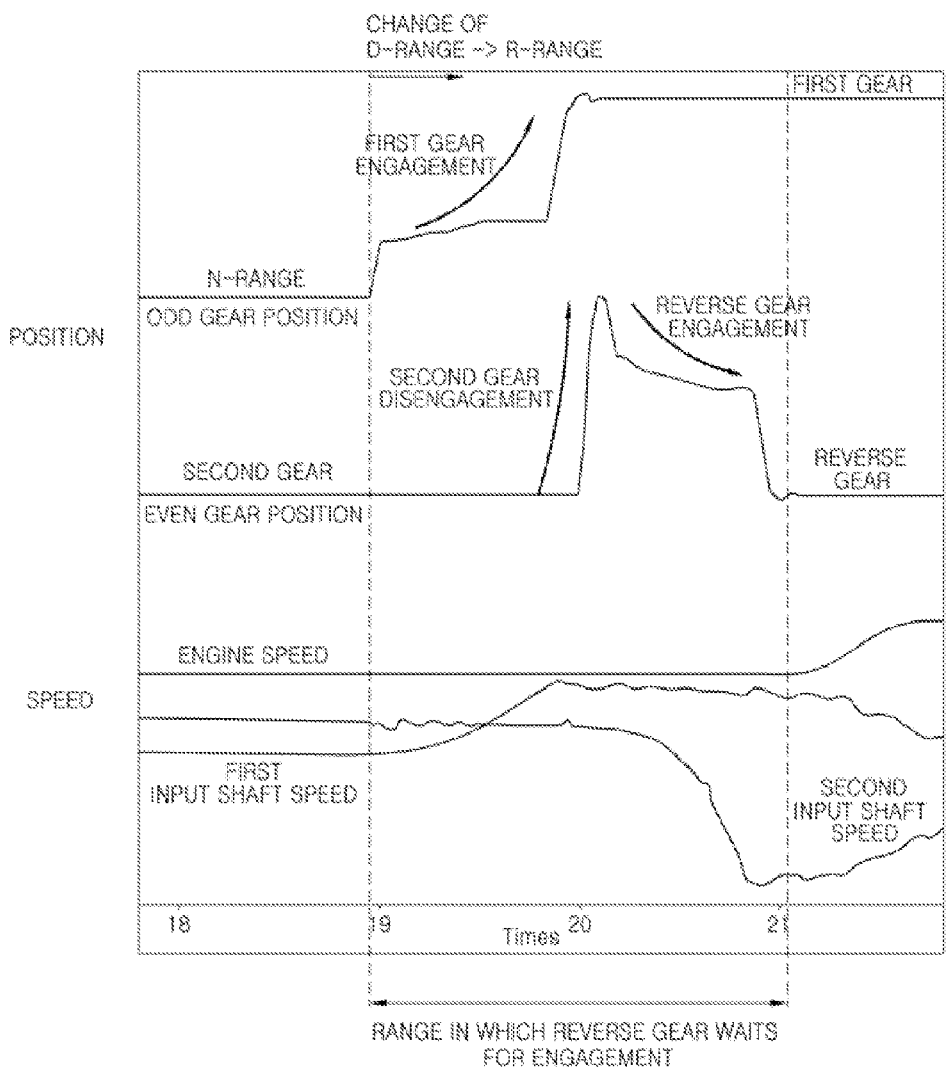

METHOD FOR CONTROLLING DRIVING OF VEHICLE

CROSS-REFERENCE TO RELATED APPLICATION

This application claims the benefit of priority to Korean Patent Application No. 10-2015-0148634, filed on Oct. 26, 2015 with the Korean Intellectual Property Office, the disclosure of which is incorporated herein by reference.

TECHNICAL FIELD

The present disclosure relates to a method for controlling driving of a vehicle, and more particularly to a method for controlling driving of a vehicle which obtains vehicle driving information when backward movement of a vehicle is controlled during forward movement thereof, and improves response to the backward movement.

BACKGROUND

Since an automated manual transmission, such as a DCT or an AMT, controls the driving of a vehicle through clutch control after gear engagement, the transmission predicts a gear selection and controls the engagement of gears for non-driven shafts.

However, the transmission controls the vehicle such that the gears wait rather than become engaged in advance before the vehicle is stopped in order to reduce noise when the gears are engaged. When it is intended to stop the vehicle by changing a shift lever from a second gear position to a reverse gear position during forward movement of the vehicle, second gear must be disengaged and the reverse gear must then be engaged. For this reason, the gears on both shafts may be disengaged simultaneously.

In this case, when the vehicle has an output shaft speed sensor, the speed and forward/backward movement of the vehicle may be determined using the output shaft speed sensor even though the gears on both shafts are simultaneously disengaged. Therefore, there is no problem relating to control of the vehicle.

However, when the vehicle has only an input shaft speed sensor and no output shaft speed sensor, the speed and forward/backward movement of the vehicle have to be determined using the input shaft speed sensor. Therefore, since the speed and forward/backward movement of the vehicle may not be adequately determined when the gears on both shafts are disengaged simultaneously, there can be a problem relating to a control of the vehicle.

In particular, if a wheel speed sensor has failed or a related controller malfunctions such that signals indicative of vehicle speed are not transmitted thereto, it may be impossible to determine the state of the transmission when the gears on both shafts are disengaged simultaneously.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Therefore, the present disclosure has been made in view of the above problems, and it is an object of the present disclosure to provide a method for controlling driving of a vehicle, which obtains vehicle driving information when backward movement of a vehicle is controlled during forward movement thereof, and improves response to the backward movement.

In accordance with the present disclosure, the above and other objects can be accomplished by the provision of a method for controlling driving of a vehicle, which includes diagnosing whether or not a wheel speed sensor has failed when a shift lever is changed to an R-range while a vehicle travels in a lowest forward gear provided on the same shaft as that of a reverse gear, disengaging the lowest forward gear and then engaging the reverse gear when the wheel speed sensor is diagnosed to be in a normal state, and calculating a vehicle speed using the wheel speed sensor in a simultaneous disengagement range, in which an odd gear and an even gear are simultaneously disengaged, during gear engagement in the disengagement of the lowest forward gear and then engaging the reverse gear.

The calculating a vehicle speed using the wheel speed sensor may include receiving vehicle forward/backward movement information immediately before the simultaneous disengagement range, and determining the received forward/backward movement information as vehicle forward/backward movement information in the simultaneous disengagement range.

The method may further include engaging a lowest forward gear provided on a different shaft from that of the reverse gear and then engaging the reverse gear, when the wheel speed sensor is diagnosed to have failed in the diagnosing whether or not a wheel speed sensor has failed, and calculating a vehicle speed using an input shaft speed sensor during gear engagement in the engaging a lowest forward gear provided on a different shaft from that of the reverse gear and then engaging the reverse gear.

The calculating a vehicle speed using an input shaft speed sensor may include determining vehicle forward/backward information using the input shaft speed sensor during gear engagement in the engaging a lowest forward gear provided on a different shaft from that of the reverse gear and then engaging the reverse gear.

When the lowest forward gear provided on the different shaft from that of the reverse gear is engaged during gear engagement in the engagement of a lowest forward gear provided on a different shaft from that of the reverse gear and then engaging the reverse gear, information about vehicle speed and vehicle forward/backward movement may be obtained using an input shaft speed sensor of an input shaft on which the engaged lowest forward gear is provided.

The lowest forward gear provided on the same shaft as that of the reverse gear may be a second gear, and the lowest forward gear provided on the different shaft from that of the reverse gear may be a first gear.

A controller may diagnose whether or not the wheel speed sensor has failed, each of the forward gear and the reverse gear may be engaged by operation of an associated gear actuator, the gear actuator may be operated by control of the controller, and the vehicle speed may be calculated using a value, which is measured by the wheel speed sensor or the input shaft speed sensor and is input to the controller.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram illustrating an overall layout of a vehicle system equipped with a DCT according to an embodiment of the present disclosure;

FIG. 2 is a flowchart for explaining a method for controlling driving of a vehicle according to an embodiment of the present disclosure;

FIG. 3 is a diagram for explaining gear engagement according to a method for controlling driving of a vehicle when a wheel speed sensor is in a normal state, according to an embodiment of the present disclosure; and FIG. 4 is a diagram for explaining gear engagement according to a method for controlling driving of a vehicle when the wheel speed sensor has failed, according to an embodiment of the present disclosure.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

FIG. 1 is a diagram illustrating an overall structure of a vehicle system equipped with a DCT according to an embodiment of the present disclosure. The vehicle system may include first and second input shafts INPUT1 and INPUT2 to which the power of an engine E is selectively transferred through first and second clutches CL1 and CL2, and an output shaft which is arranged parallel with the first and second input shafts INPUT1 and INPUT2.

The first and second input shafts INPUT1 and INPUT2 and the output shaft may be provided with a plurality of gear pairs having different gear ratios. Odd gears and even gears may be provided on the first input shaft INPUT1 and the second input shaft INPUT2, respectively.

For example, first, third, fifth, and seventh gears may be input to the first input shaft INPUT1, and second, fourth, sixth, and reverse gears may be input to the second input shaft INPUT2.

In addition, input shaft speed sensors 3 may be provided on the first and second input shafts INPUT1 and INPUT2, respectively. A wheel speed sensor 1 may be provided between a differential and each wheel.

Meanwhile, a method for controlling driving of a vehicle according to an embodiment of the present disclosure may include a diagnostic step, a first gear engagement step and a first calculation step.

A feature configuration of the present disclosure will be described in detail with reference to FIG. 2 together with the above structure of FIG. 1. The diagnostic step may first diagnose whether or not the wheel speed sensor 1 has failed when a shift lever is changed to an R-range (reverse range) while a vehicle travels in the lowest forward gear provided on the same shaft as a reverse gear.

For example, since the reverse gear may be provided on the second input shaft INPUT2, the lowest forward gear provided on the same shaft, i.e. the second input shaft INPUT2, may be a second gear.

That is, when the shift lever is changed to the R-range while the vehicle travels in a second forward gear in the state in which the shift lever is in a D-range (drive range), whether or not the wheel speed sensor 1 has failed is diagnosed.

In this case, a controller 7 may diagnose whether or not the wheel speed sensor 1 has failed.

Next, the first gear engagement step may control gear engagement such that the lowest forward gear is disengaged and the reverse gear is then engaged when the wheel speed sensor 1 is diagnosed to be in a normal state.

For example, when the controller 7 diagnoses that the wheel speed sensor 1 is in the normal state, a gear actuator 5 is controlled by the controller 7 so that the second forward gear is disengaged and the reverse gear is then engaged.

The first calculation step may calculate a vehicle speed using the wheel speed sensor 1 in a simultaneous disengagement range in which the odd gears and the even gears are disengaged simultaneously during gear engagement in the first gear engagement step.

That is, both the second gear and the reverse gear are provided on the second input shaft INPUT2. Accordingly, when the second gear is disengaged and the reverse gear is then engaged, as illustrated in FIG. 3, a range in which gears are disengaged on the second input shaft INPUT2 occurs. At the same time, a range in which gears on both shafts are simultaneously disengaged occurs, since the gears on the first input shaft INPUT1 are disengaged. Accordingly, the wheel speed sensor 1 is normally operated in the range in which the gears on both shafts are simultaneously disengaged, and the controller 7 may thus calculate a vehicle speed using values and tire information measured by the wheel speed sensor 1.

Referring to FIGS. 1 and 2, the first calculation step may include an input step and a first determination step.

In the input step, vehicle forward/backward movement information immediately before the simultaneous disengagement range may be input.

In the first determination step, the forward/backward movement information input to the input step may be taken as vehicle forward/backward movement information in the simultaneous disengagement range.

That is, it may be difficult to accurately determine the vehicle forward/backward movement information using the wheel speed sensor 1 even when the wheel speed sensor 1 is in the normal state. Therefore, the controller 7 may receive vehicle forward/backward movement information immediately before the range in which the gears on the first and second input shafts INPUT1 and INPUT2 are simultaneously disengaged, and may allow the vehicle forward/backward movement information to be unchanged in the simultaneous disengagement range.

According to the above configuration, when the reverse gear is selected while the vehicle travels in the second forward gear, the second gear is disengaged and the reverse gear is simultaneously engaged when the wheel speed sensor 1 is in the normal state, thereby enabling a response to the backward movement to be improved. In addition, it may be possible to obtain information about the speed and forward/backward movement of the vehicle, even when the gears on both shafts are simultaneously disengaged, and to improve reliability of vehicle driving control.

Meanwhile, the method according to an embodiment may further include a second gear engagement step and a second calculation step.

The second gear engagement step may control gear engagement such that the lowest forward gear, which is provided on a different shaft than the reverse gear, is engaged and the reverse gear is then engaged when the wheel speed sensor 1 is diagnosed to have failed in the diagnostic step.

For example, since the reverse gear may be provided on the second input shaft INPUT2, the lowest forward gear provided on a different shaft from the second input shaft INPUT2 may be a first gear.

That is, when the controller 7 diagnoses that the wheel speed sensor 1 has failed, the gear actuator 5 is controlled by the controller 7 so that, after the second forward gear is disengaged, the first gear is engaged and the reverse gear is then engaged.

In this case, the second calculation step may calculate a vehicle speed using the input shaft speed sensors 3 during gear engagement in the second gear engagement step.

That is, the first gear is provided on the first input shaft INPUT1, and the reverse gear and the second gear are provided on the second input shaft INPUT2. Accordingly, when the first gear is engaged and the reverse gear is then engaged after the second forward gear is disengaged, as illustrated in FIG. 4, the gear on one of the first and second input shafts INPUT1 and INPUT2 is always engaged. Therefore, the controller 7 may calculate the vehicle speed using the values and gear ratios measured by the associated input shaft speed sensor 3.

In addition, the second calculation step may include a second determination step which determines vehicle forward/backward movement information using the input shaft speed sensors 3 during gear engagement in the second gear engagement step.

As described above, when the wheel speed sensor 1 has failed, the gear on the first or second input shaft INPUT1 or INPUT2 is controlled so as to be always engaged. Consequently, the controller 7 may determine the vehicle forward/backward movement information using the values measured by the input shaft speed sensors 3.

In addition, when the lowest forward gear, which is provided on a different shaft from the reverse gear, is engaged during gear engagement in the second gear engagement step, the speed and forward/backward movement information of the vehicle may be obtained using the input shaft speed sensor 3 of the input shaft on which the engaged lowest forward gear is provided.

That is, when the wheel speed sensor 1 has failed, the first gear is engaged and the reverse gear is then engaged after the second gear is disengaged. Consequently, when the first gear is engaged, the speed and forward/backward movement information of the vehicle may be calculated using the input shaft speed sensor of the first input shaft INPUT1 on which the first gear is provided.

In addition, since the second gear may be engaged before the first gear is engaged, the speed and forward/backward movement information of the vehicle may be calculated using the input shaft speed sensor 3 of the second input shaft INPUT2 on which the second gear is provided.

According to the above configuration, when the reverse gear is selected while the vehicle travels in the second forward gear, a gear on both shafts is maintained in the state in which it is always engaged, even if the wheel speed sensor 1 has failed. Therefore, it is possible to obtain information about the speed and forward/backward movement of the vehicle, and to improve the reliability of vehicle driving control.

Hereinafter, the method for controlling driving of a vehicle according to an embodiment of the present disclosure will be described.

When the shift lever is changed to the R-range while the vehicle travels in the second forward gear in the state in which the shift lever is in the D-range, whether or not the wheel speed sensor 1 is in a normal state is diagnosed.

When the wheel speed sensor 1 is diagnosed to be in the normal state, the second gear is disengaged and the reverse gear is then engaged.

In this case, when the wheel speed sensor 1 is in the normal state, the vehicle speed is calculated using the wheel speed sensor 1. The vehicle forward/backward movement information from the time at which the second gear is disengaged to the time at which the reverse gear is engaged is determined by maintaining the vehicle forward/backward movement information, which is obtained immediately before the second gear is disengaged, without change.

However, when the wheel speed sensor 1 is diagnosed as having failed, after the second gear is disengaged, the first gear is engaged and the reverse gear is then engaged.

In this case, since the wheel speed sensor 1 has failed, the speed and forward/backward movement information of the vehicle are obtained using the input shaft speed sensor 3 of the input shaft on which the engaged gear is located.

As described above, when the reverse gear is selected while the vehicle travels in the second forward gear, the second gear is disengaged and the reverse gear is simultaneously engaged when the wheel speed sensor 1 is in the normal state, thereby enabling a response to the backward movement to be improved. In addition, it is possible to obtain information about the speed and forward/backward movement of the vehicle, even when the gears on both shafts are simultaneously disengaged, and to improve the reliability of vehicle driving control. When the wheel speed sensor 1 has failed, a gear on one of both shafts is maintained in the state in which it is always engaged. Consequently, it is possible to obtain information about the speed and forward/backward movement of the vehicle, and to improve the reliability of vehicle driving control.

As is apparent from the above description, when a reverse gear is selected while a vehicle travels in a second forward gear, a second gear is disengaged and a reverse gear is simultaneously engaged when a wheel speed sensor is in a normal state, thereby enabling a response to the backward movement to be improved. In addition, it is possible to obtain information about the speed and forward/backward movement of the vehicle, regardless of whether or not the wheel speed sensor has failed, and to improve the reliability of vehicle driving control.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method for controlling driving of a vehicle, comprising:
    diagnosing whether or not a wheel speed sensor has failed when a shift lever is changed to an R-range while a vehicle travels in a lowest forward gear provided on a same shaft as a reverse gear is provided;
    disengaging the lowest forward gear and then engaging the reverse gear when the wheel speed sensor is diagnosed to be in a normal state; and
    calculating a vehicle speed using the wheel speed sensor in a simultaneous disengagement range, in which an odd gear and an even gear are simultaneously disengaged, during gear engagement in the disengagement of the lowest forward gear and then engaging the reverse gear.

2. The method according to claim 1, wherein the step of calculating a vehicle speed using the wheel speed sensor comprises:

receiving vehicle forward/backward movement information immediately before the simultaneous disengagement range; and determining the received forward/backward movement information as vehicle forward/backward movement information in the simultaneous disengagement range.

3. The method according to claim 1, further comprising:

engaging a lowest forward gear provided on a different shaft from that of the reverse gear and then engaging the reverse gear, when the wheel speed sensor is diagnosed to have failed in the step of diagnosing whether or not a wheel speed sensor has failed; and calculating a vehicle speed using an input shaft speed sensor during gear engagement in the engagement of a lowest forward gear provided on a different shaft from that of the reverse gear and then engaging the reverse gear.

4. The method according to claim 3, wherein the step of calculating a vehicle speed using an input shaft speed sensor comprises determining vehicle forward/backward information using the input shaft speed sensor during gear engagement in the engagement of a lowest forward gear provided on a different shaft from that of the reverse gear and then engaging the reverse gear.

5. The method according to claim 4, wherein, when the lowest forward gear provided on the different shaft from that of the reverse gear is engaged during gear engagement in the engagement of a lowest forward gear provided on a different shaft from that of the reverse gear and then engaging the reverse gear, information about vehicle speed and vehicle forward/backward movement is obtained using an input shaft speed sensor of an input shaft on which the engaged lowest forward gear is provided.

6. The method according to claim 3, wherein:

the lowest forward gear provided on the same shaft as that of the reverse gear is a second gear; and the lowest forward gear provided on the different shaft from that of the reverse gear is a first gear.

7. The method according to claim 3, wherein:

a controller diagnoses whether or not the wheel speed sensor has failed;

each of the forward gear and the reverse gear is engaged by operation of an associated gear actuator;

the gear actuator is operated by control of the controller; and the vehicle speed is calculated using a value measured by the wheel speed sensor or the input shaft speed sensor and input to the controller.

* * * * *